(12) United States Patent
Sekine

(10) Patent No.: US 10,824,657 B2
(45) Date of Patent: Nov. 3, 2020

(54) SEARCH DOCUMENT INFORMATION STORAGE DEVICE

(71) Applicant: INTERACTIVE SOLUTIONS INC., Tokyo (JP)

(72) Inventor: Kiyoshi Sekine, Tokyo (JP)

(73) Assignee: Interactive Solutions Inc., Tokyo (JP)

( * ) Notice: Subject to any disclaimer, the term of this patent is extended or adjusted under 35 U.S.C. 154(b) by 0 days.

(21) Appl. No.: 16/618,092

(22) PCT Filed: May 7, 2018

(86) PCT No.: PCT/JP2018/017599
§ 371 (c)(1),
(2) Date: Nov. 27, 2019

(87) PCT Pub. No.: WO2018/221119
PCT Pub. Date: Dec. 6, 2018

(65) Prior Publication Data
US 2020/0125594 A1    Apr. 23, 2020

(30) Foreign Application Priority Data

Jun. 1, 2017 (JP) .................... 2017-109339

(51) Int. Cl.
*G06F 16/332* (2019.01)
*G06F 16/35* (2019.01)
*G06F 16/33* (2019.01)

(52) U.S. Cl.
CPC ...... *G06F 16/3323* (2019.01); *G06F 16/3334* (2019.01); *G06F 16/3349* (2019.01); *G06F 16/353* (2019.01)

(58) Field of Classification Search
CPC .................................. G06F 16/3323
See application file for complete search history.

(56) References Cited

U.S. PATENT DOCUMENTS

| 9,449,080 B1* | 9/2016 | Zhang | G06F 40/20 |
| 2008/0319746 A1* | 12/2008 | Okamoto | G06F 16/345 704/245 |
| 2010/0088605 A1* | 4/2010 | Livshin | G06T 11/60 715/731 |

FOREIGN PATENT DOCUMENTS

| JP | 8-305726 A | 11/1996 |
| JP | 8-314947 A | 11/1996 |
| JP | 8-314974 A | 11/1996 |

(Continued)

OTHER PUBLICATIONS

International Search Report of International Patent Application No. PCT/JP2018/017599 completed Jul. 6, 2018 and dated Jul. 17, 2018 (3 pages).

(Continued)

*Primary Examiner* — Dawaune A Conyers
(74) *Attorney, Agent, or Firm* — Pyprus Pte Ltd

(57) ABSTRACT

To provide a system capable of appropriately proposing a search term candidate for each page of a document. Provided is a search document information storage device comprising: a vocabulary extraction means 3; a keyword storage means 5; a keyword extraction means 7; a topic term storage means 9; a topic term extraction means 11; a search term candidate extraction means 13; a search term candidate display means 17; a search term input means 19; and a document search information storage means 21.

7 Claims, 7 Drawing Sheets

(56) References Cited

FOREIGN PATENT DOCUMENTS

| JP | 2011-242844 A | 12/2011 |
|----|---------------|---------|
| JP | 2019-16355 A  | 1/2019  |

OTHER PUBLICATIONS

Written Opinion of International Patent Application No. PCT/JP2018/017599 completed Jul. 6, 2018 and dated Jul. 17, 2018 (4 pages).

* cited by examiner

| ID | TERM IN MATERIAL | ID | KEYWORD | SCORE |
|---|---|---|---|---|
| TW01011 | ob/ob mouse | KW00121 | OBESITY GENE | 251 |
| | | KW00134 | OBESITY | 120 |
| | | KW02121 | OBESITY EXPERIMENTAL ANIMAL | 135 |
| TW01233 | SIMVA | KW00151 | SIMVASTATIN | 541 |
| | | KW0155 | STATIN | 99 |
| | | KW0222 | HYPERLIPEMIA TREATING AGENT | 493 |
| TW01235 | LIPOBAS | KW00151 | SIMVASTATIN | 500 |
| | | KW0155 | STATIN | 32 |
| | | KW0222 | HYPERLIPEMIA TREATING AGENT | 800 |

FIG. 6

| ID | KEYWORD | ID | TOPIC WORD | SCORE |
|---|---|---|---|---|
| KW00121 | OBESITY GENE | TW00034 | OBESITY | 251 |
| | | TW00401 | DIABETES | 120 |
| KW00151 | SIMVASTATIN | TW32213 | HYPERLIPIDAEMIA | 1200 |
| | | TW32112 | TYPE 2 DIABETES | 211 |
| | | TW00401 | DIABETES | 532 |
| | | TW40211 | SYMPTOMATIC HEART FAILURE | 21 |
| | | TW40212 | HEART FAILURE | 35 |
| | | TW00034 | OBESITY | 432 |

FIG. 7

| ID | TOPIC WORD | ID | CATEGORY WARD | SCORE |
|---|---|---|---|---|
| TW00034 | OBESITY | CW001 | MEDICINE | 100 |
| | | CW002 | MR | 50 |
| TW32213 | HYPERLIPIDAEMIA | CW001 | MEDICINE | 100 |
| | | CW002 | MR | 50 |

FIG. 8

| SELECT ALL CATEGORY | SELECT ALL TOPICS | SELECT ALL KEYWORD |
|---|---|---|
| ☑ AIPURO JYO | ☑ BLOOD PRESSURE AND RISK | ☐ PAMPHLET |
| ☐ AIPURO KAPUSERU | ☐ EFFECTIVENESS | ☐ FOR BRIEFING (BASIC) |
| ☐ AIPURO SEIRU | ☐ DRUG SELECTION | ☐ PRODUCT INFORMATION OVERVIEW |
| ☐ Interactive-Pro | ☐ SAFENESS | ☐ ATTACHED DOCUMENT·D1 |
| ☐ Interactive-Pro SF | ☐ MARKET | ☐ RECORD COLLECTION |
| ☐ Interactive-Pro DB | ☐ RISK OF HIGH BLOOD PRESSURE | ☐ ACADEMIC ASSOCIATION |

| SELECT ALL TERM IN MATERIAL |
|---|
| ☑ Interactive-Pro |
| ☑ VIEWER |
| ☑ INTERACTIVE CONTENT |
| ☐ INTERACTIVE CORPORATION |
| ☑ ALGORISM DETAIL |

FIG. 9

SEARCH DOCUMENT INFORMATION STORAGE DEVICE

TECHNICAL FIELD

The present invention relates to a search material information storage device. To be more specific, the present invention relates to a search material information storage device capable of effectively proposing a search term associated with each page and moreover storing information related to each page and the search term related to each page in an associated manner to effectively search each page of presentation material.

BACKGROUND ART

JP 2019-16355 A discloses a search information management device, a search information management method, and a search information management program. In this manner, search term for search is often tied with various kinds of materials. The user can find out an appropriate material by using search term. In contrast, search term attached to each material is not necessarily suitable for search, thus proposing a search term suitable for search to reflect an intention of the user is desirable.

CITATION LIST

Patent Literature

Patent Literature 1: JP 2019-16355 A

SUMMARY OF INVENTION

Technical Problem

The present invention aims to provide a system capable of appropriately proposing a candidate of search term for each page of material. The present invention moreover aims to provide a search material information storage device capable of storing information related to each page and search term related to each page in an associated manner so as to be able to effectively search each page of material.

Solution to Problem

The present invention is basically based on a knowledge that a candidate of search term suitable for each page of material can be proposed by extracting a term included in each page of material as a keyword, extracting a topic word associated with the keyword, and moreover displaying the topic word having a high evaluation.

The present invention relates to a search material information storage device.

The device is a processing device by a computer, and includes a term extraction unit 3, a keyword storage unit 5, a keyword extraction unit 7, a topic word storage unit 9, a topic word extraction unit 11, a search term candidate extraction unit 13, a search term candidate display unit 17, a search term input unit 19, and a material search information storage unit 21. Each unit is a unit by a computer and achieved by collaboration with hardware and software.

The term extraction unit 3 is a unit for extracting term in material that is term included in a certain page of material.

The keyword storage unit 5 is a unit to store term that becomes a keyword associated with the term in material.

The keyword extraction unit 7 is a unit for, using a term in material extracted by the term extraction unit 3, extracting words that become a plurality of keywords associated with the term in material from the keyword storage unit 5.

The topic word storage unit 9 is a unit that stores a topic word associated with a keyword.

The topic word extraction unit 11 is a unit for extracting a topic word associated with a keyword from the topic word storage unit 9 using a plurality of keywords extracted by the keyword extraction unit 7.

The search term candidate extraction unit 13 is a unit for extracting a candidate of search term of a certain page of material from among the topic word extracted by the topic word extraction unit 11 and the plurality of keywords extracted by the keyword extraction unit 7.

The search term candidate display unit 17 is a unit for making the display unit 15 display a candidate of search term extracted by the search term candidate extraction unit 13.

The search term input unit 19 is a unit for receiving an input indicating being a search term among the candidates of search term displayed on the display unit 15.

The material search information storage unit 21 is a unit for storing the search term input by the search term input unit 19 and information related to a certain page of material in an associated manner.

The above-mentioned search material information storage device may further include
a category word storage unit 25 and a category word extraction unit 27.

The category word storage unit 25 is a unit for storing category word associated with topic word.

The category word extraction unit 27 is a unit that extracts category word associated with topic word from the category word storage unit 25 using the topic word extracted by the topic word extraction unit 11.

The search term candidate display unit 17 of the search material information storage device further extracts the category word extracted by the category word extraction unit 27 as one candidate of search term.

In the above-mentioned search material information storage device,
the keyword storage unit 5 may store a plurality of keywords and scores or the respective keywords in an associated manner, and
the keyword extraction unit 7 may extract a plurality of keywords and scores of the respective keywords.

In the above-mentioned search material information storage device,
the topic word storage unit 9 may store topic words and scores of the respective topic words in an associated manner,
the topic word extraction unit 11 may determine a predetermined number of (one or two or more) keywords having high score from among the plurality of keywords extracted by the keyword extraction unit 7 as topic word leading candidates, and extract a topic word associated with the predetermined number of (one or two or more) topic words leading candidates from the topic word storage unit 9, and
the search term candidate extraction unit (13) may extract the predetermined number of (one or two or more) keywords having high score from among the plurality of keywords extracted by the keyword extraction unit 7 as candidates of search term as well as extract a predetermined number of (one or two or more) topic words from the topic words extracted by the topic word extraction unit 11 as candidates of search term using the scores of the keywords and the scores of the topic words.

In the above-mentioned search material information storage device, the search term candidate display unit 17 may make the display unit 15 display, as candidates of search term, a predetermined number of (one or two or more) keywords extracted as candidates of search term and a predetermined number of (one or two or more) topic words extracted as candidates of search term, as well as a keyword not extracted as a candidate of search term among the plurality of keywords extracted by the keyword extraction unit 7 and a topic word not extracted as a candidate of search term among topic words extracted by the topic word extraction unit 11 as preliminary candidates of search term, and when the search term input unit 19 receives an input indicating that one of the preliminary candidates of search term is determined as a search term, may determine the one of the preliminary candidates of search term as a search term, and may determine the candidates of search term as search terms except one of the candidates for which an input indicating not a search term is received.

The present invention also provides a program for search material information storage and a computer readable recording medium that stores the program, the program causing a computer to function as a term extraction unit 3 that extracts a term in material that is a term included in a certain page of material, a keyword storage unit 5 that stores a term that becomes a keyword associated with the term in material, a keyword extraction unit 7 that extracts a plurality of keywords that become a keyword associated with the term in material from the keyword storage unit 5 using the term in material extracted by the term extraction unit 3, a topic word storage unit 9 that stores a topic word associated with the key word, a topic word extraction unit 11 that, using the plurality of keywords extracted by the keyword extraction unit 7, extracts the topic word associated with the keywords from the topic word storage unit 9, a search term candidate extraction unit 13 that extracts a candidate of search term of a certain page of the material from the topic word extracted by the topic word extraction unit 11 and the plurality of keywords extracted by the keyword extraction unit 7, a search term candidate display unit 17 that makes a display unit 15 display the candidate of search term extracted by the search term candidate extraction unit 13, a search term input unit 19 that receives an input indicating being a search term among candidates of search term displayed on the display unit 15, and a material search information storage unit 21 that stores the search term input by the search term input unit 19 and information related to the certain page of the material in an associated manner.

Advantageous Effects of Invention

The present invention is capable of providing a system capable of appropriately proposing a candidate of search term for each page of material. The present invention is moreover capable of providing a search material information storage device capable of storing information related to each page and a search term related to each page in an associated manner to effectively search each page of material.

BRIEF DESCRIPTION OF DRAWINGS

FIG. 6 is a conceptual diagram illustrating a storage example of a topic word storage unit.

FIG. 7 is a conceptual diagram illustrating a storage example of a category word storage unit.

FIG. 8 is a conceptual diagram illustrating extracted (category word), topic word, keyword, and term in material.

FIG. 9 is an example of a display screen.

DESCRIPTION OF EMBODIMENT

Hereinafter, an embodiment of the present invention will be described with reference to the drawings. The present invention is not limited to the following embodiment, and also includes one appropriately modified from the following embodiment by the person skilled in the art within an obvious range.

Figure 1:
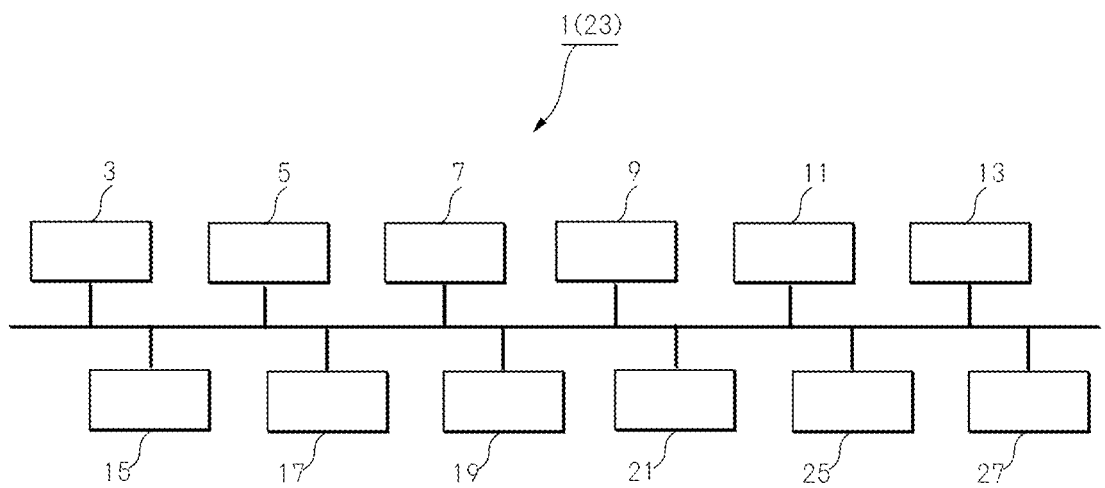
FIG. 1 is a block diagram for illustrating a search material information storage device according to the present invention.

FIG. 1 is a block diagram for illustrating a search material information storage device according to the present invention. This device is a processing device by a computer. The computer may be one of a mobile terminal, a desk-top personal computer, and a server, or a combination of two or more of them. These are typically connected by the Internet (Intranet) or the like so as to be able to transmit and receive information. Functions may be shared by using a plurality of computers, for example, by making any of the computers have some function.

Figure 2:
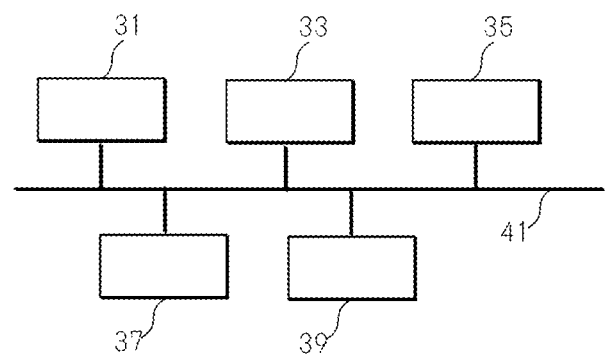
FIG. 2 is a block diagram illustrating a basic configuration of a computer.

FIG. 2 is a block diagram illustrating a basic configuration of the computer. As is described in the drawing, the computer includes an input unit 31, an output unit 33, a control unit 35, an arithmetic unit 37, and a storage unit 39, and each element is connected by a bus 41 or the like to be able to transmit and receive information. For example, a control program may be stored in the storage unit, and various kinds of information may be stored in the storage unit. When predetermined information is input from the input unit, the control unit reads out the control program stored in the storage unit. Then, the control unit appropriately reads out information stored in the storage unit and transmits the information to the arithmetic unit. The control unit also appropriately transmits input information to the arithmetic unit. The arithmetic unit performs arithmetic processing using the various kinds of information received, and an arithmetic result is stored in the storage unit. The control unit reads out the arithmetic result stored in the storage unit and output it from the output unit. In this manner, various kinds of processing are executed. The various kinds of processing are executed by each unit.

Figure 3:
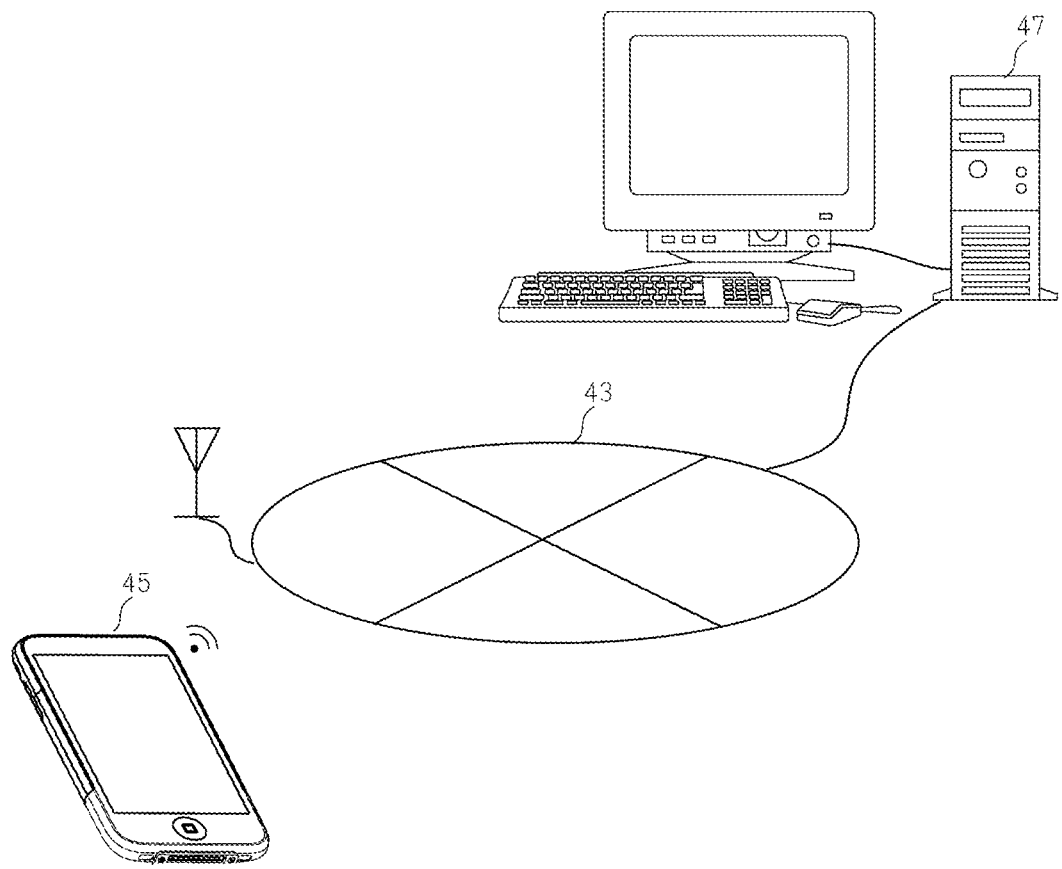
FIG. 3 is a conceptual diagram illustrating a system example of the present invention.

FIG. 3 is a conceptual diagram illustrating a system example according to the present invention. As illustrated in FIG. 3, the system (system including the device of the present invention) according to the present invention may include a mobile terminal 45 connected to the Internet or an intranet 43, and a server 47 connected to the Internet or the Intranet 43. Of course, a single computer or mobile terminal may function as the device of the present invention, or a plurality of servers may exist.

The search material information storage device 1 stores information to read out each page of presentation material (e.g., identification number and page number of presentation material), and one or a plurality of search terms associated with the page in an associated manner to readily search information wanted by the user. The search material information storage device 1 may include any of a terminal device and the storage unit (storage device) of the computer (or the server). Also, the search material information storage device may include a database and database management software. In the search material information storage device, page of presentation material may be ranked or scored for each search term. For example, supposing that a plurality of pages is stored in association with diabetes as a search term. In this case, information such as a page having highest rank, a page having second most rank for diabetes as a search term, a page having highest score, a page having second most score for diabetes as a search term, and the like may be also stored in the storage unit.

As illustrated in FIG. 1, the search material information storage device 1 includes a term extraction unit 3, a keyword storage unit 5, a keyword extraction unit 7, a topic word storage unit 9, a topic word extraction unit 11, a search term candidate extraction unit 13, a search term candidate display unit 17, a search term input unit 19, and a material search information storage unit 21. Each unit is a unit by a computer, and achieves each processing by collaboration between hardware and software.

The term extraction unit 3 is a unit for extracting term in material that is term included in a certain page of material. An example of material is so called a presentation material. Format of the presentation material is not specifically limited. Examples of presentation software include Microsoft (registered trademark), PowerPoint (registered trademark), KINGSOFT (registered trademark) KINGSOFT Office (registered trademark), Apache (registered trademark), OpenOffice Impress (registered trademark), Keynote (registered trademark), Lotus•Freelance (registered trademark), Illustrator (registered trademark), PDF (registered trademark), and Prezi (registered trademark). An example of material is, for example, a material created by any of the presentation software. The presentation software is software capable of displaying content for each page on, for example, the display unit such as a screen.

Figures 4, 5:
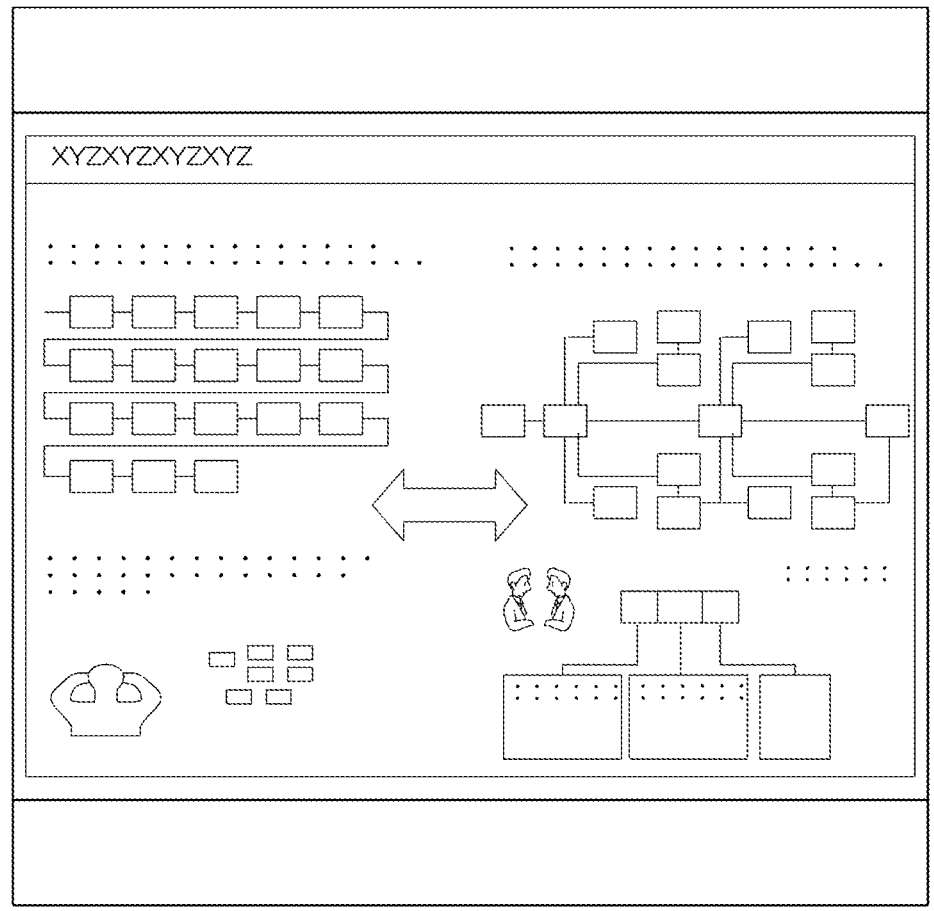
FIG. 4 is an example of a certain page of presentation material.
FIG. 5 is a conceptual diagram illustrating a storage example of a keyword storage unit.

FIG. 4 is an example of a certain page of presentation material. As illustrated in FIG. 4, the presentation material includes a plurality of texts input by a creator. The user can view a plurality of characters. In contrast, the computer stores information such as text input by the user and input information related to the text (size of character, color of character, presence or absence of animation) with the text. A preferable example of the term extraction unit 3 is to apply evaluation (score) of a text in accordance with input information related to the text (size of character, color of character, presence or absence of animation) when the text is extracted. For example, a possibility of indicating the content of presentation material becomes higher as character becomes larger, so that high score is applied. For example, in a case where character is reddish color or in a case where animation is attached to text, the character or the text often indicates a content of the presentation material, so that high score is applied. The term extraction unit 3 is sufficient to store evaluation (score) of effect associated with the text, read out the evaluation as a text related score when term is extracted, and add it to or multiply it to another score for evaluation when a score described below is calculated.

In contrast, the term extraction unit 3 itself is known. The presentation material includes a plurality of kinds of text information. The presentation material is stored in, for example, the server storage unit or the storage unit (in the computer). The term extraction unit 3 reads out each page of presentation material stored, and reads out text included in each page. Then, the term extraction unit 3 subjects the text read out to word class analyzation. In this context, for example, a word class database exists in the storage unit, and various terms and their word classes are stored therein. In this context, score as search term of various terms may be also stored together in the storage unit in accordance with usage. For example, when the search material information storage device is for pharmaceutical manufacturers, MR (medical representative), or MS (pharmaceutical wholesale), a high score may be assigned to various disease names as compared with general noun. Also, a high score higher may be assigned to various drug names and active ingredients as compared with general noun although the score is lower than that of disease names. The term extraction unit 3 is sufficient to extract term (noun in particular) included in text to extract one or a plurality of terms in material using its frequency or the score of the term stored in the storage unit. For example, when the term extraction unit 3 extracts term A, term B, and term C from a certain page, the term C is appeared by two times, the term A and term B are appeared by one time, and scores of the terms A, B, and C stored in the storage unit are respectively 5, 50, and 40, scores of the term A, B, and C are sufficient to be respectively determined to be 5, 50, and 80. For example, when the number of extractions of term in material is set to 2, the term extraction unit 3 is sufficient to extract the terms C and B as terms in material. The terms in material (terms C and B) extracted are stored in the storage unit in association with the information related to page that allows to read out the page. This enables to read out the terms C and B with their pages. Another example of the term extraction unit 3 is one that identifies a portion where the largest font is used in a certain page of presentation. The term extraction unit 3 applies a predetermined coefficient to a term in material included in the portion where the largest font is used. The coefficient (first coefficient: $a_1$) is sufficient to be stored in the storage unit. The term extraction unit 3 stores the first coefficient in the storage unit together with the term in material included in the portion where the largest font is used. The term extraction unit 3 may also store a coefficient (second coefficient: $a_2$) that depends on the size of font together with the term in material in the storage unit.

The keyword storage unit 5 is a unit to store term that becomes a keyword associated with the term in material. The keyword storage unit 5 is sufficient to be provided by a storage unit and an element for reading out information from the storage unit (e.g., control program). The keyword is a term to make search of each page easy by using not only a plurality of terms in material but also a term associated therewith as a search term when each page is searched. This reduces search terms stored in association with each page, enabling quick search. In some cases, a term in material may be a keyword as it is. The keyword can be regarded as a first conversion word related to term in material. The keyword may be a term suitable to be used for search selected from a plurality of kinds of terms in material.

The term in material is a term included in presentation. Accordingly, in some cases, the term in material does not match with search term or is not suitable as search term. For example, a term of ob gene and ob/ob mouse is supposed to be included in presentation. The terms are associated with obesity gene (and obesity, obesity experimental animal). Accordingly, the keyword storage unit 5 stores, in association with ob gene and ob/ob mouse that are terms in material, obesity gene (and obesity, obesity experimental animal) that is their keyword.

Because of presence of the keyword storage unit 5, search term stored in association with each page becomes a unified term. This makes it possible to quickly read out an associated page in search.

FIG. 5 is a conceptual diagram illustrating a storage example of the keyword storage unit. As illustrated in FIG. 5, the keyword storage unit stores one or a plurality of keywords for each of a plurality of terms in material in an associated manner, and stores scores (this score is referred to as $b_1$) of the respective keywords in an associated manner. The scores are preferably preliminarily input such that the score becomes higher as the keyword becomes more suitable as a term used for search.

The keyword extraction unit 7 is a unit for, using a term in material extracted by the term extraction unit 3, extracting words that become a plurality of keywords associated with the term in material from the keyword storage unit 5. The keyword storage unit 5 stores a term that becomes a keyword in association with the term in material. This enables the keyword extraction unit 7 to read out a term that becomes a keyword associated with the term in material from the keyword storage unit 5 using the term in material. Typically, a plurality of terms in material is extracted from a certain page. Accordingly, a term that becomes a keyword for a certain page is typically extracted by a plurality of times. Also, the number of terms that become a keyword associated with term in material is also plural typically (score may be assigned to each of the terms). Accordingly, a term that becomes a keyword for a certain page is typically extracted by a plurality of times. Note that a case may occur where a term in material is a term that becomes a keyword. That is, a term in material may be extracted as a keyword as it is. The keyword extraction unit 7 may evaluate the score of each of the keywords using the coefficient of term in material and the score of keyword stored in the storage unit. An example of score of keyword is $a_1 \times a_2 \times b_1$. In order to calculate the score, a control program for performing the above-mentioned calculation is stored in the storage unit, so that the control unit is sufficient to read out the control program, read out each coefficient and score stored in the storage unit, make the arithmetic unit perform calculation for obtaining $a_1 \times a_2 \times b_1$, and make the storage unit store a calculation result. Also, appearance frequency of term in material (this coefficient is referred to as $a_{21}$) and an addition coefficient in a case where a specific keyword is extracted from among a plurality of types of terms in material (this coefficient is referred to as $a_{22}$) may be made to be stored in the storage unit, and a score of keyword may be obtained by obtaining $a_1 \times a_2 \times a_{21} \times a_{22} \times b_1$ to store the score in the storage unit. Besides, a strong coefficient may be applied for an emphasis color included in a certain page. In this case, the keyword extraction unit 7 is sufficient to include a unit for analyzing color of term from page, and a storage unit for storing a coefficient for each color, and read out the coefficient related to the color from the storage unit using the color of term analyzed. It is sufficient that coefficient and score are stored for various elements for not only keyword but also topic word and category word in the same manner basically, the coefficient and score are read out, a score is obtained by multiplication, addition, or the like, the score of each word is stored for comparison to obtain a leading candidate.

The topic word storage unit 9 is a unit that stores a topic word associated with a keyword. The topic word storage unit 9 is sufficient to be provided by a storage unit and an element (e.g., control program) for reading out information from the storage unit.

For example, the topic word storage unit is sufficient to store a topic word such as obesity in association with a keyword such as obesity gene, obesity, or obesity experimental animal. The topic word may be a term that further unifies a plurality of keywords or a term made to be a superordinate concept. Using the topic word enables quick search. Examples of topic word include disease name, drug name, active ingredient name, and pharmaceutical company name. That is, the topic word can be regarded as a second conversion word related to term in material. The topic word may be a term obtained by assigning a term suitable to be used for search for a plurality of kinds of keywords. Also, the topic word may be related to message.

The topic word extraction unit 11 is a unit for extracting a topic word associated with a keyword from the topic word storage unit 9 using a plurality of keywords extracted by the keyword extraction unit 7.

A topic word associated with a keyword is stored in the topic word storage unit 9. Accordingly, the topic word extraction unit 11 extracts a topic word associated with a keyword from the topic word storage unit 9 using the plurality of keywords extracted by the keyword extraction unit 7.

FIG. 6 is a conceptual diagram illustrating a storage example of the topic word storage unit. As illustrated in FIG. 6, the topic word storage unit stores one or a plurality of topic words for each of a plurality of keywords in an associated manner, and stores a score of each of the topic words in an associated manner. The scores are preferably preliminarily input such that the score becomes higher as the keyword becomes more suitable as a term used for search.

The search term candidate extraction unit 13 is a unit for extracting a candidate of search term of a certain page of material from among the topic word extracted by the topic word extraction unit 11 and the plurality of keywords extracted by the keyword extraction unit 7.

For example, one or a plurality of topic words supposed to be associated with a certain page are stored in the storage unit. Also, a plurality of keywords supposed to be associated with a certain page is stored.

When the control program controls to determine, for example, every topic word as a candidate of search term and determine several keywords (e.g., four keywords in consideration of size to be displayed on the display unit) as candidates of search term, the search term candidate extraction unit 13 determines every topic word read out as a candidate of search term and determines the four keywords as candidates of search term.

Note that the keyword storage unit 5 may store a plurality of keywords and scores or the respective keywords in an associated manner and the keyword extraction unit 7 may extract the scores of the respective keywords with the plurality of keywords. In this case, for example, a keyword having a high score is extracted as a candidate of search term.

The topic word storage unit 9 may store topic words and scores of the respective topic words in an associated manner, and the topic word extraction unit 11 may determine a predetermined number (one or two or more) of keywords having high score from among the plurality of keywords extracted by the keyword extraction unit 7 as topic word leading candidates to extract a topic word associated with the predetermined number of topic ward leading candidates from the topic word storage unit 9.

The above-mentioned search material information storage device may further include a category word storage unit 25 and a category word extraction unit 27.

The category word storage unit 25 is a unit for storing category word associated with topic word.

The category word extraction unit 27 is a unit for extracting category word associated with topic word from the category word storage unit 25 using the topic word extracted by the topic word extraction unit 11. The category word can be regarded as a third conversion word related to term in material. The category word may be a selected term suitable to be used for category search for a plurality of kinds of topic words. An example of category word may be one that indicates a target probably having an interest in material. For example, when a certain page of material is of a certain drug for diabetes for the MR (the drug is, for example, sufficient to be stored in association with topic word), examples of category words may be "MR", "diabetes", "medicine". Alternatively, when a certain page of material is of accounting information for banker of bank, examples of category word may be banker or may be "banker" and "accounting". Still alternatively, category word may be information related to product. The search term candidate display unit 17 of the search material information storage device further extracts the category word extracted by the category word extraction unit 27 as one candidate of search term. FIG. 7 is a conceptual diagram for illustrating a storage example of the category word storage unit. The category word storage unit stores one or a plurality of category words for each of a plurality of topic words in an associated manner, and stores scores of the respective category words in an associated manner. The scores are preferably preliminarily input such that the score becomes higher as the keyword becomes more suitable as a term used for search.

FIG. 8 is a conceptual diagram illustrating (category word), topic word, keyword, and term in material, which are extracted.

The search term candidate extraction unit 13 may extract a predetermined number (one or two or more) of keywords having high score from among the plurality of keywords extracted by the keyword extraction unit 7 as candidates of search term. Alternatively, the search term candidate extraction unit 13 may extract a predetermined number (one or two or more) of topic words from among the topic wards extracted by the topic word extraction unit 11 using score of keyword and score of topic word as candidates of search term. For example, the topic word storage unit 9 stores topic words and scores or the respective topic words in an associated manner. Also, the keyword storage unit 5 stores a plurality of keywords and scores of the respective keywords in an associated manner. An original keyword exists for a certain topic word. That is, topic word is one read out using keyword. Topic word results in being constantly associated with one or a plurality of keywords. In this case, the search term candidate extraction unit 13 reads out the scorer related to a certain topic word from the topic word storage unit 9 as well as reads out scores of respective keywords that become extraction originates of the topic word from the keyword storage unit 5. Then, when a plurality of keywords exists for a certain topic word, the search term candidate extraction unit 13 makes the arithmetic unit sum scores of respective keywords as well as multiplies the score of topic word by the score of keyword (or total score of keywords). In this manner, tallied score related to topic word is obtained to make the storage unit store the tallied score. The search term candidate extraction unit 13 reads out the tallied score for a plurality of topic words and makes the arithmetic unit compare the tallied scores to extract a predetermined number (one or two or more) of topic words. In this manner, the search term candidate extraction unit 13 can extracts a predetermined number of topic words even when the number of topic words to be extracted is determined.

The search term candidate display unit 17 is a unit for making the display unit 15 display a candidate of search term extracted by the search term candidate extraction unit 13.

The search term candidate display unit 17 may make the display unit 15 display, as candidates of search term, a predetermined number of (one or two or more) keywords extracted as candidates of search term and a predetermined number of (one or two or more) topic words extracted as candidates of search term, as well as a keyword not extracted as a candidate of search term among the plurality of keywords extracted by the keyword extraction unit 7 and a topic word not extracted as a candidate of search term among topic words extracted by the topic word extraction unit 11 as preliminary candidates of search term, and when the search term input unit 19 receives an input indicating that one of the preliminary candidates of search term is determined as a search term, may determine the one of the preliminary candidates of search term as a search term, and may determine the candidates of search term as search terms except one of the candidates for which an input indicating not a search term is received.

The material search information storage unit 21 is a unit for storing the search term input by the search term input unit 19 and information related to a certain page of material in an associated manner.

The device of the present invention may be one that further displays a candidate of content type in accordance with a kind of presentation material and stores the content type in association with each page of presentation (or presentation itself). In this case, the device of the present invention reads out format of presentation (Power Point (registered trademark), PDF (registered trademark), Word (registered trademark), or the like) stored in the storage unit. The device of the present invention reads out text included in the format read out. The device of the present invention includes a term database for analyzing content storing term for analyzing content. The device of the present invention analyzes type of content using the term stored in the term database for analyzing content. For example, when material is of PDF (registered trademark), and a text named "attached document" exists at a relatively early stage, "attached document" is extracted as a candidate of content type of the material. Then, when "attached document" is displayed as content type on the display unit and an authentication in input by the user, "attached document" related to content type is stored in association with the material.

Figure 9:
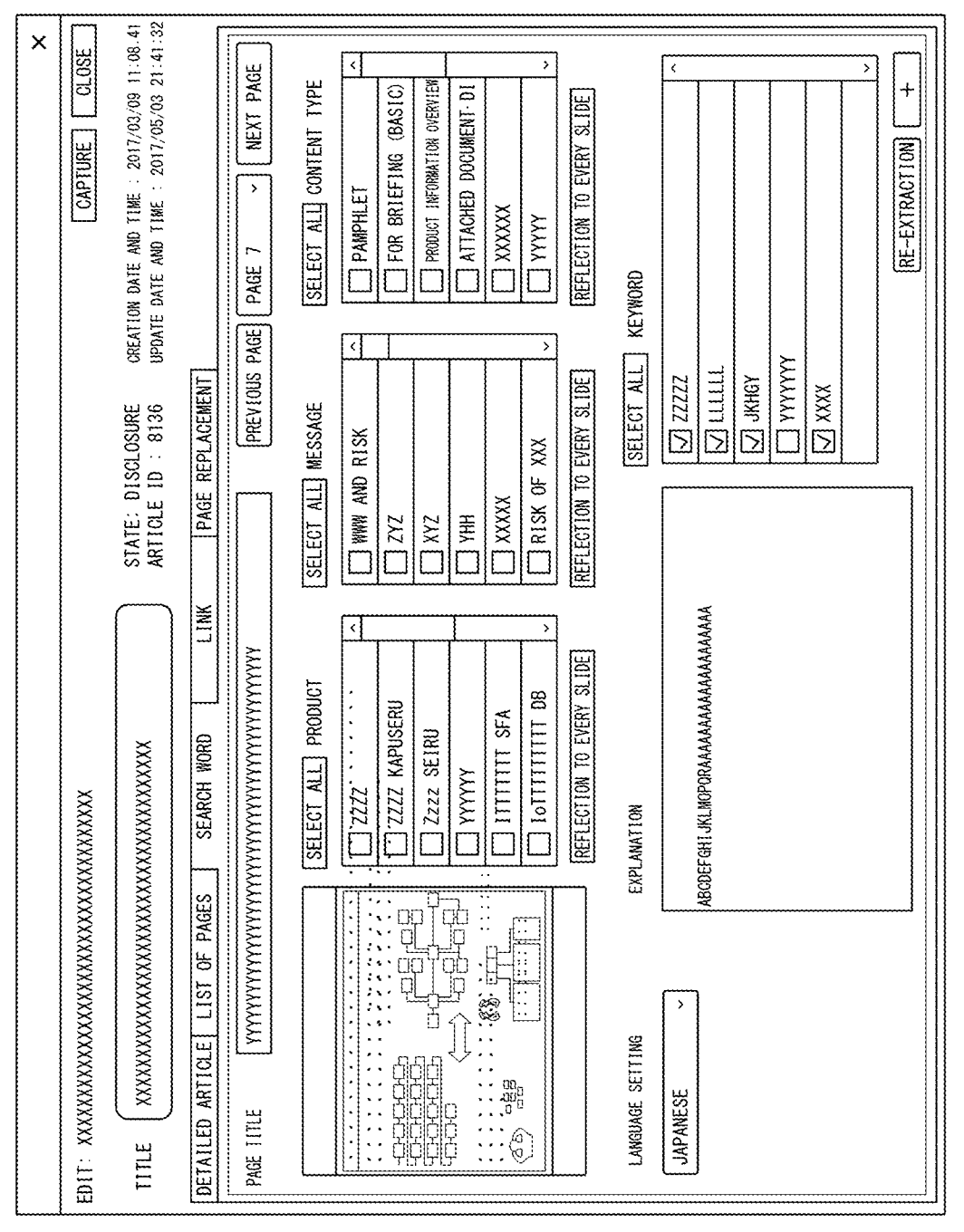

FIG. 9 is an example of the display screen. In this example, a certain page of presentation material is displayed at an upper half portion of the display screen. For candidates of search term, an icon for adoption and rejection (checkbox) as well as a candidate of each search term are displayed Candidates of search term are aligned in the order of category word, topic word, and keyword from left in the example of FIG. 9. Term in material may be also displayed on the display unit. In the example of FIG. 9, a checkbox for adoption is marked for the term extracted by the search term candidate extraction unit 13 as a search term. An authentication button exists at a lower portion of the display screen, and when the user inputs an authentication instruction to the computer (terminal) using the authentication button, candidate of search term is authenticated. The device 1 that has received an input from the computer stores the search terms authenticated (and scores of respective search terms) for a certain page of presentation in the storage unit in an associated manner.

The search term input unit 19 is a unit for receiving an input indicating being a search term among the candidates of search term displayed on the display unit 15. In the example of FIG. 9, an input in a checkbox functions as search term input unit 19. When an input for rejecting a candidate of search term under adoption state is performed by the user, for example, a checkbox for rejection is marked. Upon receiving the rejection input from the checkbox, the device 1 makes the candidate of search term instructed be in rejection state. Then, when the user inputs an authentication instruction to the computer (terminal) using the authentication button, the candidate of search term is rejected. Note that the device 1 may reduce score of candidate of search term rejected (e.g. scored is reduced to half) to store as a search term associated with the above-mentioned page. A checkbox for rejection is marked (or any checkbox is not marked) for the term that has not been extracted as a search term by the search term candidate extraction unit 13. When an input for adapting a candidate of search term under rejection state is performed by the user, for example, a checkbox for adoption is marked. Upon receiving the adoption input from the checkbox, the device 1 makes the candidate of search term instructed be in adoption state. Then, when the user inputs an authentication instruction to the computer (terminal) using the authentication button, the candidate of search term is adopted. That is, the search term is stored in association with a certain page as a search term of the certain page. In this context, because of the search term selected by the user, the search term may be stored in a state where its score is added or multiplied.

Figure 10:
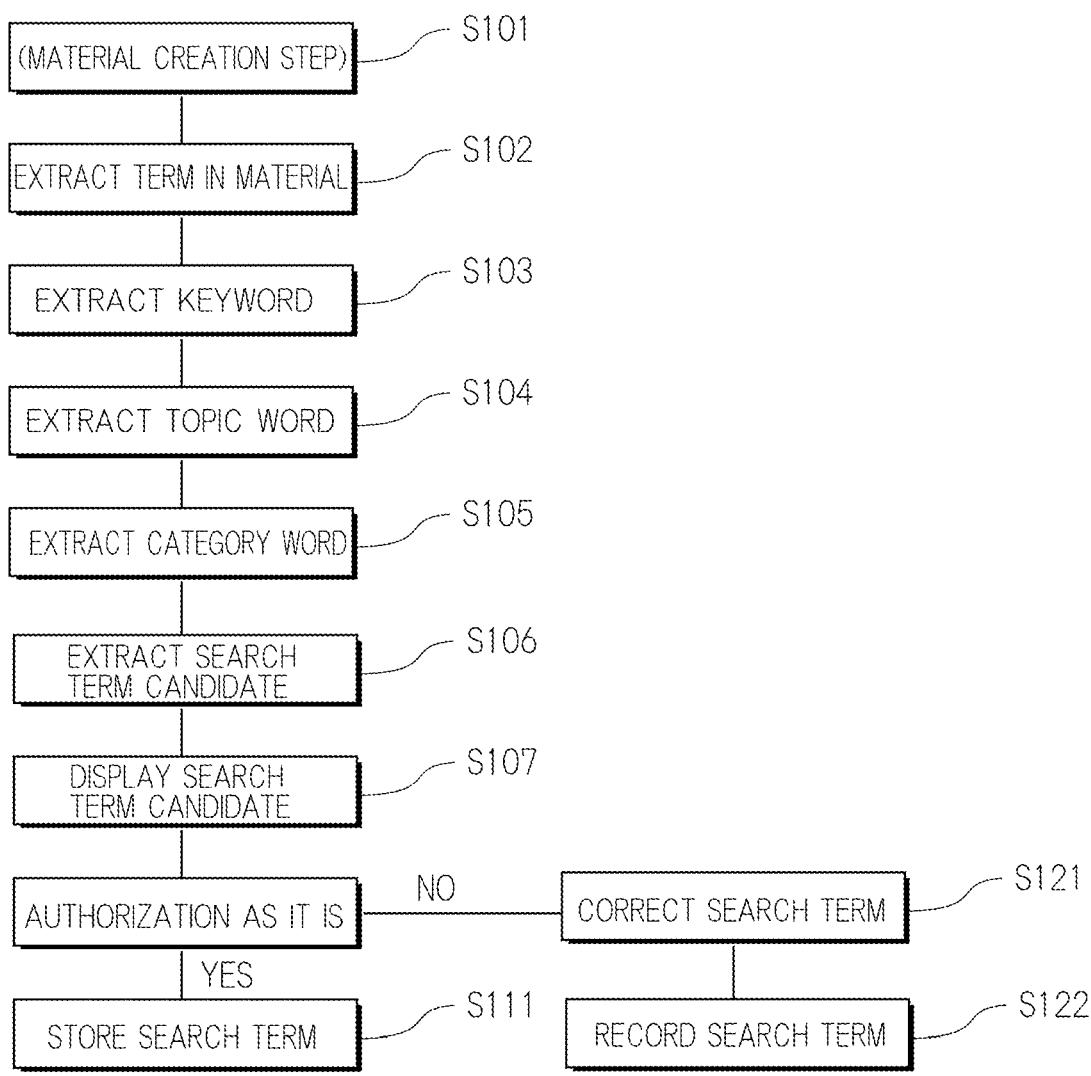
FIG. 10 is a flowchart for illustrating a usage example of a search material information storage device according to the present invention.

FIG. 10 is a flowchart for illustrating a usage example of the search material information storage device of the present invention. That is, FIG. 10 is a diagram for illustrating a search material information storage method using the search material information storage device. S denotes step(process) in the drawing.

The user creates presentation material (S101). The terminal or computer of the user stores presentation material in the storage unit (or the storage unit of the server).

The device 1, for each page of presentation material, extracts a term in material that is a term included in the page (S102). In this context, the device 1 may apply a score to the term in material. For example, when appearance frequency of the term in material is high, or when the term in material is bold letter, colored character, or accompanied by animation or the like, an additional point may be preliminarily registered to apply a score to the term in material using the additional point information registered. Also, the device 1 may have a dictionary of term in material, term in material and score may be stored in an associated manner for various terms in material in the dictionary, and the device 1 may read out score of term in material. In addition, score of term in material may be obtained using score of term in material existing in the dictionary and score related to the additional point (e.g., by addition or multiplication). In this case, when the number of terms in material is preliminarily set, the term in material having a high score may be determined as a term in material.

Using one or the plurality of terms in material extracted, the device 1 extracts a plurality of keywords associated with the one or the plurality of terms in material from the storage unit (S103). A term that becomes a keyword associated with term in material is recorded in the storage unit. Accordingly, the device 1 can extracts a keyword associated with a term in material from the storage unit by using the term in material. In this context, a score as a search term may be applied for each keyword. When the same keyword is selected from different terms in material, the possibility is high that the keyword becomes a search term, so that the keyword may be a target of additional point. In this case, additional point related to high frequency of keyword may be registered and additional point in accordance with duplicate count of keyword may be read out for addition or multiplication with score. In this manner, a plurality of keywords (and scores of the respective keywords) can be obtained.

When the device 1, using a plurality of keywords, extracts a topic word associated with the keywords from the storage unit (S104), the processing is similar to the extraction step of keyword.

The device 1 may extract a category word associated with a topic word from the storage unit using the topic word extracted (S105). This step is an optional step.

The device 1 extracts a candidate of search term of a certain page of material from among a topic word and a plurality of keywords (and the category word) (S106). The device 1 is sufficient to preliminarily store a control command for extracting candidate of search term, and extract candidate of search term of a certain page of material from among the topic word, the plurality of keywords (and the category word) in accordance with the control command. An example of the control command is to extract four keywords having high score from among the plurality of keywords, two topic words having high score among topic words (, and every category word) as candidates of search term. In this manner, a candidate of search term for a certain page of presentation material is automatically extracted. Note that, the storage unit may store the candidate of search term extracted as a search term of the certain page.

Next, when the search term is made to be authenticated or determined by the user, the candidate of search term extracted may be made to be displayed on the display unit by the device 1 (S107). In this context, a target page of presentation (reduced in size) and a topic word and a plurality of keywords (and category word) that have not been determined as candidates of search term may be displayed together on the display unit. In this case, the user becomes possible to select search term.

When an authentication is made by the user as it is, the terminal receives an input related to the authentication, and the candidate of search term extracted by the device 1 is stored in the storage unit as search term associated with a certain page of presentation material as it is (S111).

In contrast, when the terminal receives an input indicating that candidate of search term is rejected, or when the terminal receives an input indicating that a term other than candidate of search term is adopted, a candidate of search term reflecting correction of the cases is determined as a search term associated with the certain page in the storage unit (S121).

When an authentication is made by the user after performing the above-mentioned correction, the terminal receives an input related to the authentication, and a candidate of search term corrected is stored in the storage unit as a search term associated with the certain page of presentation material (S122).

The present invention also provides a program for search material information storage and a computer readable recording medium that stores the program, the program causing a computer to function as a term extraction unit 3 that extracts a term in material that is a term included in a certain page of material, a keyword storage unit 5 that stores a term that becomes a keyword associated with the term in material, a keyword extraction unit 7 that extracts a plurality of keywords that become a keyword associated with the term in material from the keyword storage unit 5 using the term in material extracted by the term extraction unit 3, a topic word storage unit 9 that stores a topic word associated with the key word, a topic word extraction unit 11 that, using the plurality of keywords extracted by the keyword extraction unit 7, extracts the topic word associated with the keywords from the topic word storage unit 9, a search term candidate extraction unit 13 that extracts a candidate of search term of a certain page of the material from the topic word extracted by the topic word extraction unit 11 and the plurality of keywords extracted by the keyword extraction unit 7, a search term candidate display unit 17 that makes a display unit 15 display the candidate of search term extracted by the search term candidate extraction unit 13, a search term input unit 19 that receives an input indicating being a search term among candidates of search term displayed on the display unit 15, and a material search information storage unit 21 that stores the search term input by the search term input unit 19 and information related to the certain page of the material in an associated manner.

Figure 11:
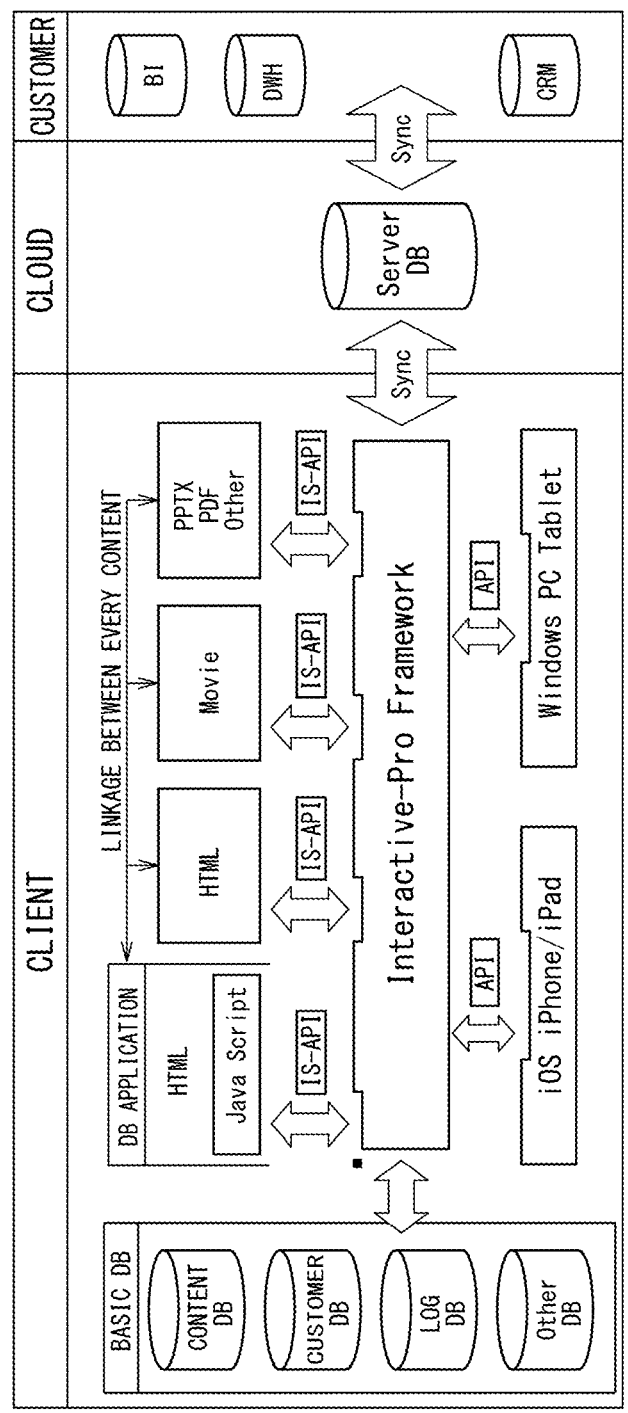
FIG. 11 is a conceptual diagram for illustrating a usage example of the search material information storage device according to the present invention.

FIG. 11 is a conceptual diagram (block diagram) for illustrating a usage example of the search material information storage device according to the present invention. This example includes a content DB, a customer DB, a log DB, and a DB storing other information as a basic database (DB). The databases are connected with an engine called Interactive-Pro Framework via an interface. The engine is configured to be able to receive and transmit information from and to various types of terminals (e.g., PC tablet, mobile terminal, mobile phone) via an API (application programming interface). The engine is also configured to receive and transmit information from and to a control program, an application, HTML data, movie data, PowerPoint data, PDF data, document data, and database management software, which are in client. The engine is also configured to be synchronized with the server (cloud) to be able to receive and transmit information. In contrast, in the example of FIG. 11, transmission and reception of information are made possible to and from various databases including business Intelligence (BI), customer relationship management (CRM), and data warehouse (DWH) of customer, and software via the server.

INDUSTRIAL APPLICABILITY

The present invention is utilizable in information service industry.

REFERENCE SIGNS LIST 1 search material information storage device
3 term extraction unit
5 keyword storage unit
7 keyword extraction unit
9 topic word storage unit
11 topic word extraction unit
13 search term candidate extraction unit
15 display unit
17 search term candidate display unit
19 search term input unit
21 material search information storage unit
23 search material information storage device
25 category word storage unit
27 category word extraction unit

The invention claimed is:

1. A search material information storage device comprising:
a term extraction unit that extracts a term in material that is a term included in a certain page of material;
a keyword storage unit that stores a term that becomes a keyword associated with the term in material;
a keyword extraction unit that extracts a plurality of keywords associated with the term in material extracted by the term extraction unit from the keyword storage unit using the term in material extracted by the term extraction unit;
a topic word storage unit that stores a topic word associated with the keyword;
a topic word extraction unit that, using the plurality of keywords extracted by the keyword extraction unit, extracts the topic word associated with the keywords extracted by the keyword extraction unit from the topic word storage unit;
a search term candidate extraction unit that extracts a candidate of search term of a certain page of the material from the topic word extracted by the topic word extraction unit and the plurality of keywords extracted by the keyword extraction unit;
a search term candidate display unit that makes a display unit display the candidate of search term extracted by the search term candidate extraction unit;
a search term input unit that receives an input indicating being a search term among candidates of search term displayed on the display unit; and
a material search information storage unit that stores the search term input by the search term input unit and information related to the certain page of the material in an associated manner.

2. The search material information storage device according to claim 1 further comprising:
a category word storage unit that stores a category word associated with the topic word; and
a category word extraction unit that extracts the category word associated with the topic word from the category word storage unit using the topic word extracted by the topic word extraction unit; wherein the search term candidate display unit further extracts the category word extracted by the category word extraction unit as one candidate of the search term.

3. The search material information storage device according to claim 1, wherein
the keyword storage unit
stores the plurality of keywords and scores of the respective keywords in an associated manner, and
the keyword extraction unit extracts the scores of the respective keywords together with the plurality of keywords.

4. The search material information storage device according to claim 3, wherein
the topic word storage unit
stores topic words and scores of the respective topic words in an associated manner,
the topic word extraction unit
determines a predetermined number of keywords having high score from among the plurality of keywords extracted by the keyword extraction unit as topic word leading candidates, and extracts a topic word associated with the predetermined number of topic word leading candidates from the topic word storage unit, and
the search term candidate extraction unit
extracts the predetermined number of keywords having high score from among the plurality of keywords extracted by the keyword extraction unit as candidates of search term as well as extracts a predetermined number of topic words from the topic words extracted by the topic word extraction unit as candidates of search term using the scores of the keywords and the scores of the topic words.

5. The search material information storage device according to claim 4, wherein
the search term candidate display unit
makes the display unit display, as candidates of search term, the predetermined number of keywords extracted as candidates of search term and the predetermined number of topic words extracted as candidates of search term,
as well as a keyword not extracted as a candidate of search term among the plurality of keywords extracted by the keyword extraction unit and a topic word not extracted as a candidate of search term among topic words extracted by the topic word extraction unit as preliminary candidates of search term, and when the search term input unit receives an input indicating that one of the preliminary candidates of search term is determined as a search term, determines the one of the preliminary candidates of search term as a search term, and
determines the candidates of search term as search terms except one of the candidates for which an input indicating not a search term is received.

6. A computer-implemented method for search material information storage comprising:
executing the method on a computer processing device to function as
a term extraction unit that extracts a term in material that is a term included in a certain page of material,
a keyword storage unit that stores a term that becomes a keyword associated with the term in material,
a keyword extraction unit that extracts a plurality of keywords associated with the term in material extracted by the term extraction unit from the keyword storage unit using the term in material extracted by the term extraction unit,
a topic word storage unit that stores a topic word associated with the keyword,
a topic word extraction unit that, using the plurality of keywords extracted by the keyword extraction unit, extracts the topic word associated with the keywords from the topic word storage unit,
a search term candidate extraction unit that extracts a candidate of search term of a certain page of the material from the topic word extracted by the topic word extraction unit and the plurality of keywords extracted by the keyword extraction unit,
a search term candidate display unit that makes a display unit display the candidate of search term extracted by the search term candidate extraction unit
a search term input unit that receives an input indicating being a search term among candidates of search term displayed on the display unit, and a material search information storage unit that stores the search term input by the search term input unit and information related to the certain page of the material in an associated manner.

7. A non-transitory computer readable recording medium that records the computer-implemented method according to claim 6.

* * * * *